(12) United States Patent
Nyström et al.

(10) Patent No.: US 8,305,872 B2
(45) Date of Patent: Nov. 6, 2012

(54) SYNCHRONIZATION IN OFDM USING POLYNOMIAL CANCELLATION CODING

(75) Inventors: Johan Nyström, Uppsala (SE); Magnus Almgren, Sollentuna (SE); Lei Wan, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 202 days.

(21) Appl. No.: 12/522,204

(22) PCT Filed: Jan. 9, 2007

(86) PCT No.: PCT/SE2007/050006
§ 371 (c)(1),
(2), (4) Date: Jun. 18, 2010

(87) PCT Pub. No.: WO2008/085092
PCT Pub. Date: Jul. 17, 2008

(65) Prior Publication Data
US 2010/0278138 A1   Nov. 4, 2010

(51) Int. Cl.
*H04J 11/00* (2006.01)
*H04J 3/06* (2006.01)
*H04B 1/00* (2006.01)
*H04B 15/00* (2006.01)
*H04B 1/40* (2006.01)
*H04L 5/12* (2006.01)

(52) U.S. Cl. ........ 370/206; 370/350; 370/510; 370/520; 375/145; 375/261; 455/62; 455/84

(58) Field of Classification Search .......... 370/204–211, 370/215, 324, 350, 503–520; 375/145, 149, 375/363–366; 455/62, 84
See application file for complete search history.

(56) References Cited

U.S. PATENT DOCUMENTS

| | | | |
|---|---|---|---|
| 2004/0156328 A1* | 8/2004 | Walton et al. | 370/313 |
| 2007/0064665 A1* | 3/2007 | Zhang et al. | 370/343 |
| 2008/0316913 A1* | 12/2008 | Kim et al. | 370/210 |

FOREIGN PATENT DOCUMENTS
WO    99/62207 A1    12/1999

OTHER PUBLICATIONS

PCT International Search Report, dated Nov. 5, 2007, in connection with International Application No. PCT/SE2007/050006.
PCT International Preliminary Report on Patentability, dated Apr. 6, 2009, in connection with International Application No. PCT/SE2007/050006.
Shentu, J. et al: "Blind Estimation of Time and Frequency Offset for PCC-OFDM", Vehicular Technology Conference, 2001. VTC 2001 Spring. IEEE VTS 53rd, vol. 1, pp. 702-706.

(Continued)

*Primary Examiner* — Alpus H Hsu
*Assistant Examiner* — Jeremy Costin
(74) *Attorney, Agent, or Firm* — Potomac Patent Group PLLC (57) ABSTRACT

In a method of enabling synchronization for a channel in an OFDM based telecommunication system initially providing a symbol for transmission and selecting at least two carrier frequencies, subsequently determining a respective weighting parameter for the selected frequencies and finally transmitting the symbol on all selected frequencies based on the weighting parameters.

8 Claims, 5 Drawing Sheets

OTHER PUBLICATIONS

Zhao, Y. et al: "Intercarrier interference self-cancellation scheme for OFDM mobile communication systems", Communications, IEEE Transactions on, vol. 49, No. 7, pp. 1185-1191, Jul. 2001.

Tang, J. et al: "An efficient ICI cancellation method in OFDM systems", Communications, Circuits and Systems, 2005. Proceedings. 2005 International Conference on, vol. 1, pp. 255-259, May 27-30, 2005.

3GPP Technical Specification TS 25.213, Technical Specification Group Radio Access Network; Spreading and modulation (FDD), Release 4, V.4.1.0, Jun. 2001.

IEEE Standard 802.16-2004 "IEEE Standard for Local and metropolitan area networks; Part 16: Air Interface for Fixed Broadband Wireless Access Systems", IEEE Computer Society and IEEE Microwave Theory and Techniques Society, Aug. 2004.

Armstrong, J., "Polynomial cancellation coding of OFDM to reduce Intercarrier interference due to Doppler spread," IEEE Globecom, vol. 5, pp. 2771-2776, 1998.

Seaton, K. et al. "Polynomial Cancellation Coding and Finite Differences", IEEE Transactions on Information Theory, Jan. 2000.

Armstrong, J. et al., "Frequency Domain Equalization for OFDM systems with mapping of data onto sub-carrier pairs and overlapping symbol periods", Proceedings of the 5th International Symposium on Communications Theory and Applications, England, Jul. 1999, pp. 102-104.

PCT Written Opinion, dated Nov. 5, 2007, in connection with International Application No. PCT/SE2007/050006.

Chinese Office Action, dated Aug. 24, 2011, in connection with Chinese Patent Application No. 200780049595.8, (See Foreign Associate provided translation below).

Foreign Associate provided translation of Chinese Office Action, dated Aug. 24, 2011, in connection with Chinese Patent Application No. 200780049595.8.

Shentu, J. et al. "Blind Estimation of Time and Frequency Offset for PCC-OFDM" Vehicular Technology Conference 2001, No. 1, pp. 702-706, May 9, 2001.

* cited by examiner

SYNCHRONIZATION IN OFDM USING POLYNOMIAL CANCELLATION CODING

TECHNICAL FIELD

The present invention relates to wireless OFDM communication systems in general, specifically to methods and arrangements for enabling improved channel synchronization in such systems.

BACKGROUND

Orthogonal Frequency Division Multiplexing (OFDM) has gained considerable interest in recent years. However, OFDM is extremely sensitive to carrier frequency offsets, which are mainly caused by the inherent instabilities of the carrier frequency oscillators of the transmitter and receiver. Further, symbol timing synchronization must be achieved within an acceptable preamble period. This is due to the fact that symbol-timing errors may cause inter symbol interference (ISI) since Fast Fourier Transformation (FFT) windows can include adjacent OFDM symbol components. To ensure ISI-free detection, precise timing information regarding where the symbol boundary lies is needed to ensure that an uncorrupted portion of the received OFDM symbol can be sampled for FFT.

In wireless communication systems, the so called Random Access Channel (RACH) is an uplink channel, which is always received from the entire cell. The RACH carries the messages of the user terminals (UT) identity number, capability class, etc to report to the base station (BS), and the command to require system configuration information from the BS. To ensure the synchronization to BS, the RACH usually carries a sequence of pilots as well.

The design of RACH typically relies heavily on the radio access strategy, e.g. physical (PHY) layer access technology, frame structure, synchronization method, etc. For OFDM-based mobile communication system, RACH may have more choices by considering the frequency-time domain characteristics of OFDM.

Referring to IEEE802.16-2004 standard, the initial ranging frame is inefficient due to two preamble OFDM symbols. Comparing to user-specific PRACH scrambling in WCDMA system, it is less effective due to single preamble pattern in the initial ranging frame. In addition, 802.16-2004 is for the fixed broadband wireless access system, whose initial ranging is not good for cellular systems.

However, the method of WCDMA RACH cannot be used for OFDM systems, because the scrambling code is generally not a mandatory requirement in OFDM systems.

Generally the RACH is a contention-based channel. The UL synchronization is based on the user-specified pilot sequence. A set of preset orthogonal pilot sequences is needed. In WCDMA system [1], the RACH is characterized by a collision risk and by being transmitted using open loop power control. IEEE802.16-2004 [2] also adopts the contention-based random access, called initial ranging, where a specific frame structure is used starting with a long preamble.

Therefore, there is a need for improved synchronization for OFDM-based communication systems.

SUMMARY

A general aim of the present invention is to provide improved synchronization in OFDM based telecommunication systems.

A further aim is to enable robust, simple, flexible and efficient synchronization in an OFDM based telecommunication system.

A specific aim is to provide an improved channel structure for an uplink in an OFDM based telecommunication system.

According to a basic aspect the present invention includes initially providing (S0) a symbol for transmission and selecting (S1) at least two carrier frequencies, subsequently determining (S2) a respective weighting parameter for the selected frequencies and finally transmitting (S3) the symbol on all selected frequencies based on the weighting parameters, to enable improved synchronization for a channel between two nodes in a OFDM telecommunication system.

Advantages of the present invention comprises:
Enabling a robust synchronization method
Enabling a simple and flexible synchronization method
Enabling an efficient synchronization method.

BRIEF DESCRIPTION OF THE DRAWINGS

The invention, together with further objects and advantages thereof, may best be understood by referring to the following description taken together with the accompanying drawings, in which:

FIG. 6$a$-$b$ are diagrams illustrating the time domain power shape and periodicity of an embodiment of the present invention;

FIG. 6$c$-$d$ are diagrams illustrating the time domain power shape and periodicity of another embodiment of the present invention;

ABBREVIATIONS

| | |
|---|---|
| OFDM | Orthogonal Frequency Division Multiplexing |
| RACH | Random Access Channel |
| PCC | Polynomial Cancellation Code |
| UL | UpLink |
| FFT | Fast Fourier Transformation |
| IFFT | Inverse Fast Fourier Transformation |

DETAILED DESCRIPTION

The present invention will mainly be described in the context of a random access channel (RACH) for the uplink (UL) in an OFDM based wireless telecommunication system. However, it is equally applicable to a general synchronization method in a downlink, or for a closed-loop synchronization channel.

Figure 1:
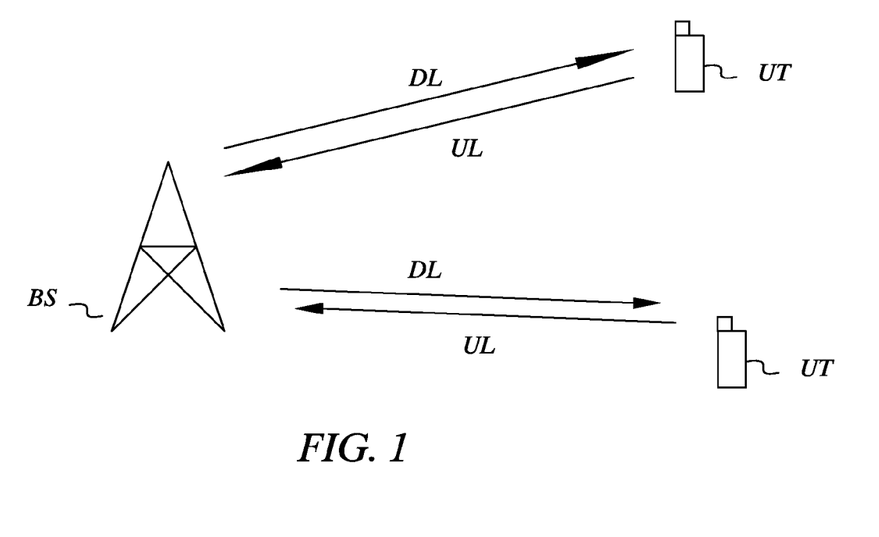
FIG. 1 is a schematic illustration of a communication system.

A system in which the present invention can be utilized is illustrated in FIG. 1. The system comprises a plurality of communicating nodes, e.g. a base station (BS) that is communicating with a plurality of user terminals (UT) via uplink (UL) and downlink (DL) channels.

Figure 2:
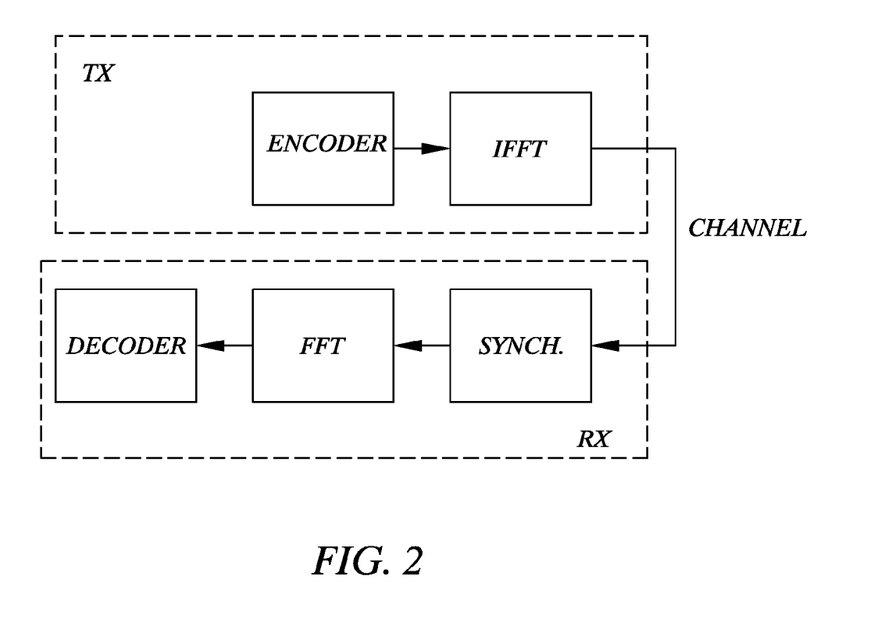
FIG. 2 is a schematic flow diagram of OFDM modulation.

The general functional blocks of OFDM are illustrated in FIG. 2. The typical OFDM transmitter TX converts an information stream to serialized PSK or QAM symbols. The serial stream is then converted into a parallel stream that is modulated in an inverse FFT operation. The outputs of the IFFT streams are then serialized and modulated by a single carrier. The receiver side RX synchronizes with the transmitter and subsequently implements a reverse process where the received data is split back into parallel streams that are processed by an FFT. The output of the FFT is then serialized into a single stream for decoding.

Accordingly, an embodiment of the present invention discloses a Random Access Channel (RACH) structure for an OFDM-based UL, wherein a symbol is transmitted by combining multiple neighboring sub-carriers in OFDM. The combining weights are determined according to known methods, i.e. polynomial cancellation coding (PCC) [3-5].

Figure 3:
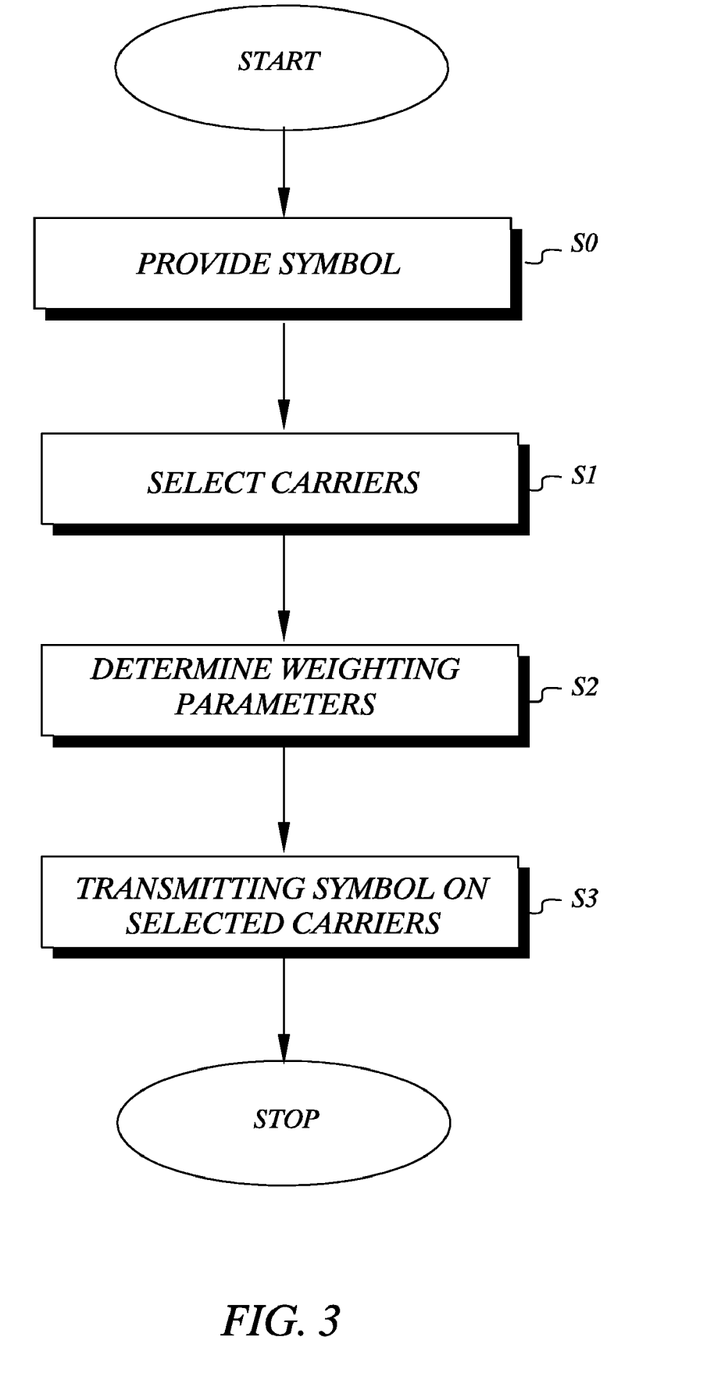
FIG. 3 is a schematic flow diagram of an embodiment of the present invention.

According to a basic embodiment, as illustrated in FIG. 3, a symbol is provided S0 for transmission e.g. at a base transceiver station in an OFDM system. At least two carrier frequencies are subsequently selected S1 for carrying the provided symbol. Based on the selected carriers a weighting parameter or relation is determined S2 for each selected carrier frequency. Finally, the provided symbol is transmitted S3 on each of the selected carrier frequencies based on the determined weights.

The number of carrier frequencies that are selected determines the level of robustness of the channel, i.e. more selected carriers ensure a higher degree of robustness. Consequently, according to a specific embodiment, the number of carriers can be selected based on a requested Quality of Service, or type of communication, or some other parameter. For yet another specific embodiment an initial synchronization attempt can be based on a fewer number of carriers. If the attempt fails, the number of carriers can be ramped up or increased until a synchronization attempt succeeds.

The selection of which carriers to use can, according to one embodiment, be performed randomly or, according to another embodiment, based on some predetermined selection scheme.

It has been recognized by the inventors that utilizing so called polynomial cancellation coding PCC provides a close to optimal relationship between the weighting parameters of the respective selected carrier frequencies. PCC does however not have a straightforward time-domain periodicity, but the time-domain periodicity can be achieved by multiplying PCC with a known sequence e.g. known additive pilot symbol. Accordingly, an additive pilot symbol can be introduced to the UL during an initial coarse synchronization, followed by a finer synchronization based on a transferred time-domain periodicity. Comparing to traditional OFDM, PCC has a sharper pulse shape in the frequency domain, which enables better robustness against frequency offset and Doppler shift.

In addition, utilizing PCC enables a flexible solution where a varying number of carrier frequencies can be utilized, varying from 2 to any higher value. The more sub-carriers that are used, the better performance can be obtained. Accordingly, the suggested RACH of the present invention can be kept at a fixed power but have a ramped-up combining ratio to get random access.

Polynomial combination coding, as recognized by the inventors, provides a close to optimal combining of multi-tones for Fast Fourier Transformation FFT without necessitating a pulse filter. With reference to [3-5], for groups of k sub-carriers the optimal relative weighting of the sub-carriers happen to be the coefficients of the polynomial $(1-x)^{k-1}$. For example, $(1, -1)$ are the PCC weights for a 2-tone group, and $(1, -3, 3, -1)$ are the weights for a 4-tone group, etc.

Figure 4:
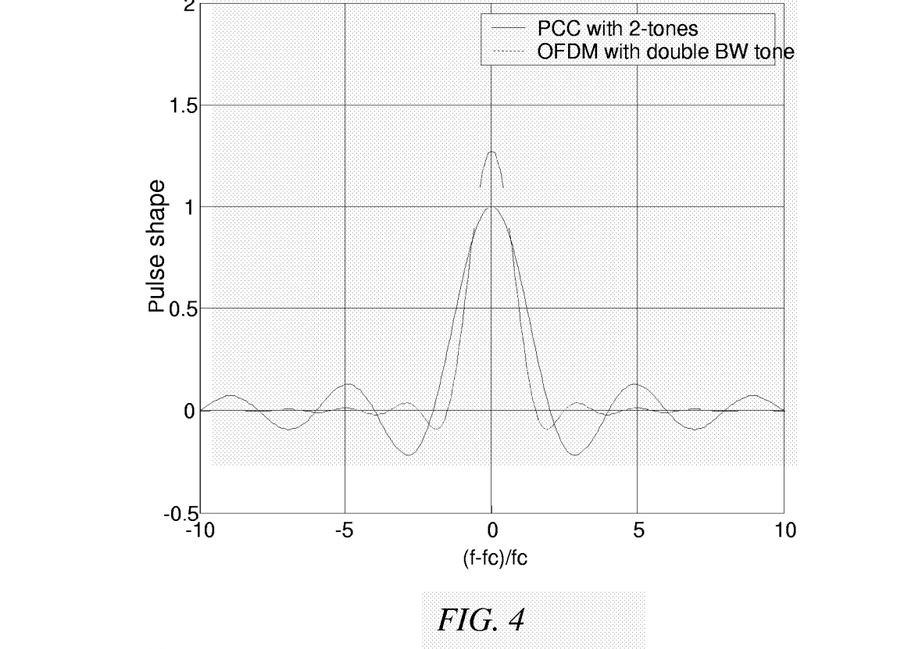
FIG. 4 is a diagram illustrating a comparison of the pulse shape of present invention and prior art.

As stated previously, the PCC has a very good pulse shape, which enables effective reduction of the ICI (10-20 dB for some cases), therefore it is very robust against frequency offset and Doppler shift. The pulse shapes of PCC-FFT according to the invention and known dual tone FFT are illustrated in FIG. 4 and FIG. 5, which clearly shows an improved pulse shape for PCC-FFT according to the present invention.

Figure 5:
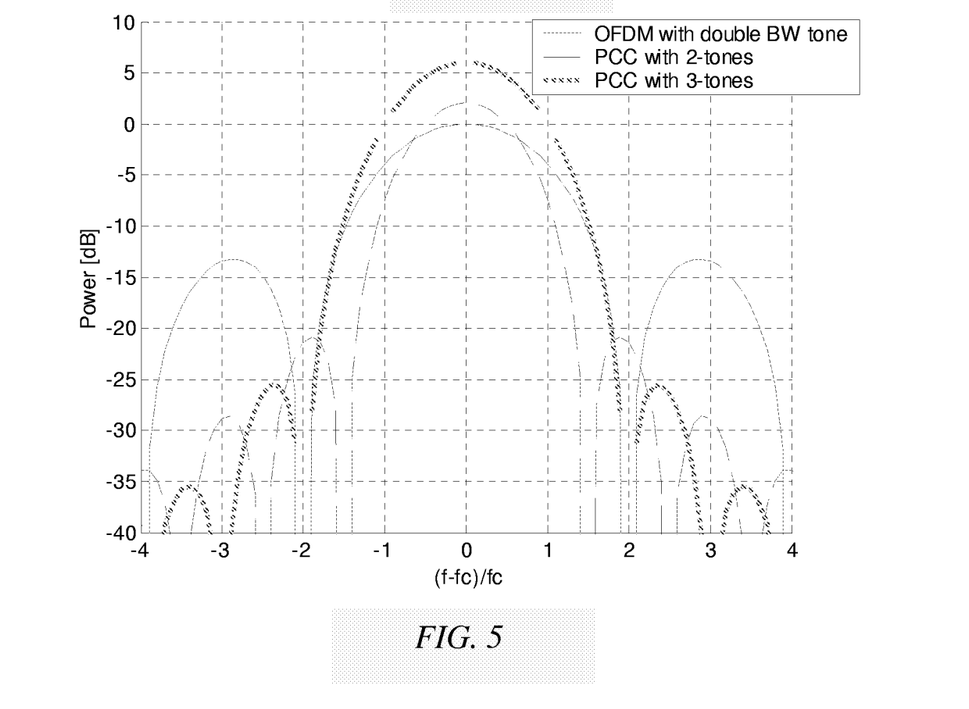
FIG. 5 is a diagram illustrating a comparison of the pulse shape of prior art and different embodiments of the present invention.

The left sub-figures in FIG. 5 shows the time domain power shapes for 2-tone-PCC and 4-tone-PCC of a complexed sequence respectively, which show that the time-domain power of PCC concentrate to the central part. Consequently, PCC also has an obviously better spectral roll-off against large delay spread that is longer than the cyclic prefix.

For a given sequence $\{X(m), m=1\sim M\}$, its 2-tone-PCC has the frequency domain expression of:

$$Y_2(k) = \begin{cases} X(m), & k = (2m-1) \\ -X(m), & k = 2m \end{cases}, m = 1 \sim M \qquad (1)$$

For its 4-tone-PCC, the frequency domain signal is expressed as:

$$Y_4(k) = \begin{cases} X(m), & k = (4m-3)^{th} \\ -3 \cdot X(m), & k = (4m-2) \\ 3 \cdot X(m), & k = (4m-1) \\ -X(m), & k = 4m \end{cases}, m = 1 \sim M \qquad (2)$$

Denoting $\{x(l), l=1\sim M\}$ as IFFT$[\{X(m)\}]$, it can be derived that the time domain signal $\bar{y}_2$=IFFT$[Y_2(k)]$= $\{y_2(n), n=1\sim 2M\}$ of the 2-tone-PCC is:

$$y_2(n) = x(n \ \% \ M) \cdot \left(1 - \exp\left(2\pi j \cdot \frac{n}{2M}\right)\right), n = 1 \sim 2M \qquad (3)$$

Where a % b stands for the module of a on b. The time domain signal of the 4-tone-PCC $\bar{y}_4$ is:

$$y_4(n) = x(n \ \% \ M) \cdot \qquad (4)$$
$$\left(1 - 3\exp\left(2\pi j \cdot \frac{n}{4M}\right) + 3\exp\left(2\pi j \cdot \frac{2n}{4M}\right) - \exp\left(2\pi j \cdot \frac{3n}{4M}\right)\right),$$
$$n = 1 \sim 4M$$

Accordingly, the time-domain periodicity can be obtained by weighting the PCC time-domain signal with the corresponding sequences, i.e.:

$$\tilde{y}_2 = \left\{ \frac{y_2(n)}{\left(1 - \exp\left(2\pi j \cdot \frac{n}{2M}\right)\right)}, n = 1 \sim 2M \right\} \qquad (5)$$

$$\tilde{y}_4 = \left\{ \frac{y_4(n)}{\left(1 - 3\exp\left(2\pi j \cdot \frac{n}{4M}\right) + 3\exp\left(2\pi j \cdot \frac{2n}{4M}\right) - \exp\left(2\pi j \cdot \frac{3n}{4M}\right)\right)}, \right. \qquad (6)$$
$$\left. n = 1 \sim 4M \right\}$$

Figure 6A:
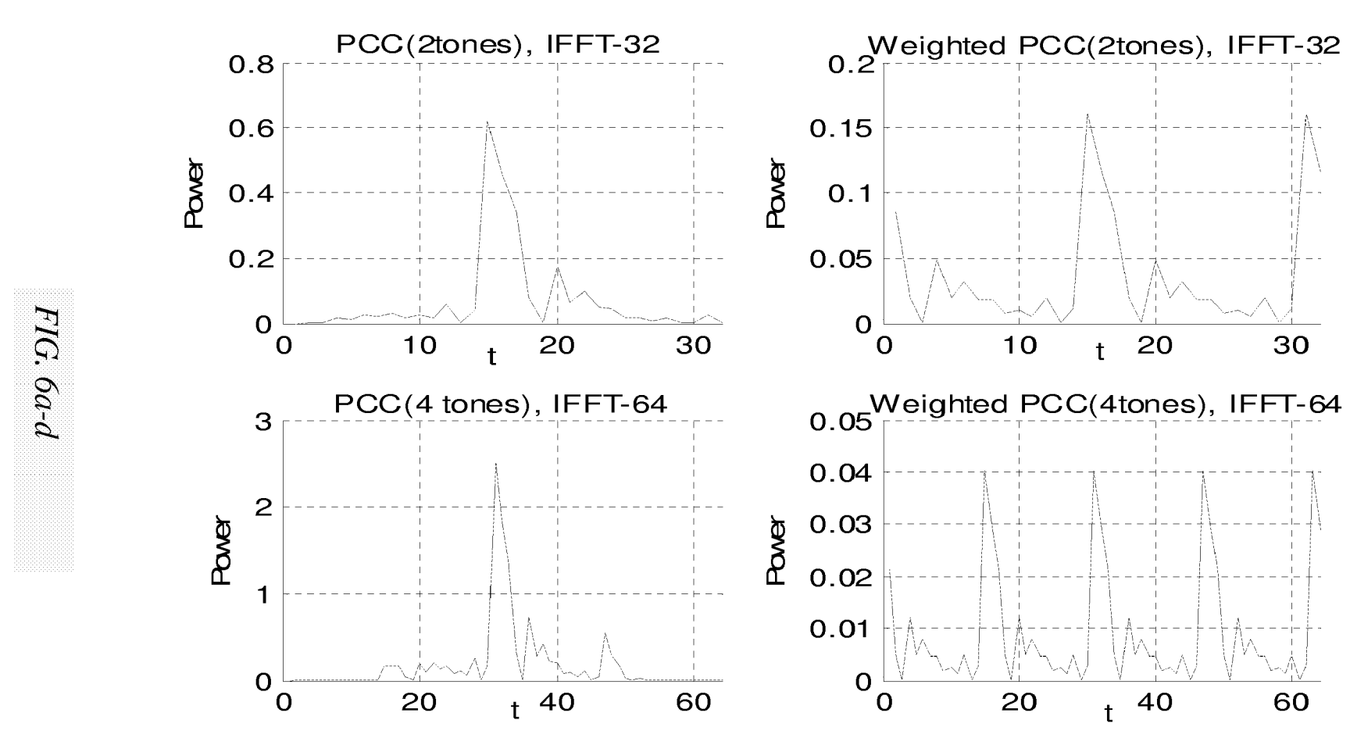

The weighted PCC signals $\tilde{y}_2$ and $\tilde{y}_4$ are plotted in the right two sub-figures in FIG. 6. The time-domain periodicity of the weighted PCC can be used for the finer synchronization. However, a pre coarse synchronization is still required for RACH. If without any assistance of synchronization pilots, the central-condensed power pattern of the received PCC signal can be used. To make the time-domain synchronization more convenience, a certain synchronization pilot sequence can be added to the time-domain PCC signals periodically, preferably on the beginning of the FFT symbol where PCC signal has very small power. After the first step of the coarse synchronization, the preset synchronization pilot sequence is subtracted form the received signal to get the pure PCC signal.

It should, however, be understood that the weighting factors can be determined in some other manner than PCC. Thus, the present invention is not limited to PCC. Below, a few further examples of possible weighting strategies according to the invention are disclosed.

This invention, as already stated, discloses a RACH structure for OFDM-based UL. The main point is the multi-tone transmission in OFDM by introducing the repetition code along the frequency domain. There are several candidates of the repetition code, namely:

Repeating the symbol on multiple neighbouring sub-carriers without any weighting. This method will not give benefit of the pulse shape.

Spreading the symbol with a given spread code, e.g. Walsh code, where the combining ratio is limited to the power of 2.

Spreading the symbol with the polynomial cancellation coding (PCC), which is known to be optimal with the IFFT/FFT implementation. Therefore, PCC is the most interested method for this invention.

Figure 7:
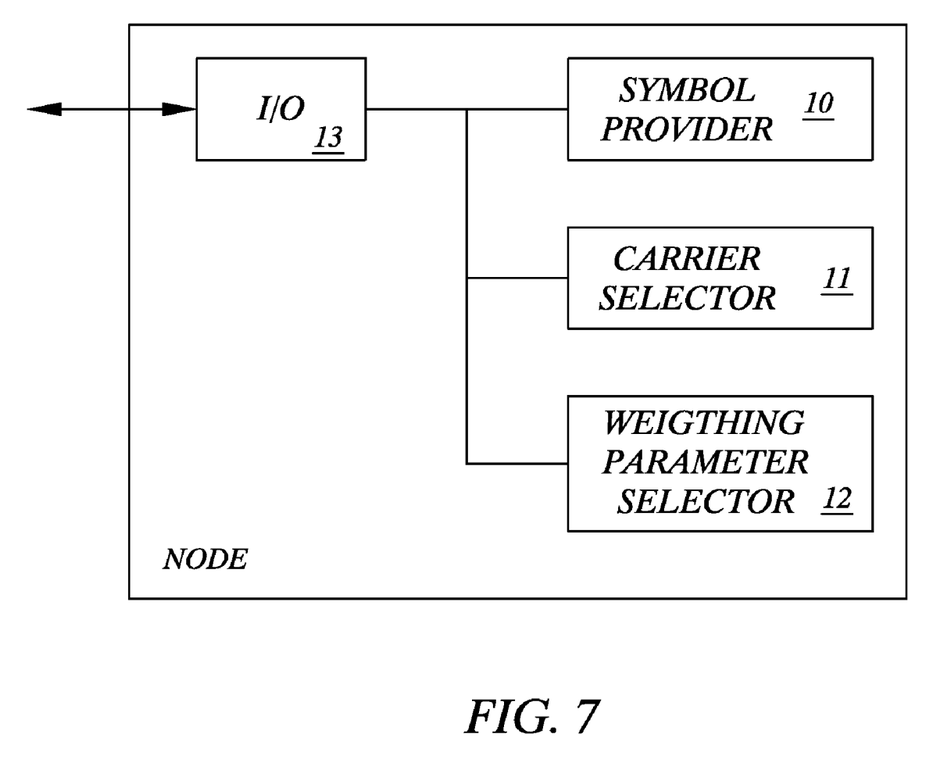
FIG. 7 is a schematic illustration of an embodiment of an arrangement according to the present invention.

In order to enable the previously described method an arrangement is described with reference to FIG. 7. In correspondence with the method of the present invention the arrangement comprises a unit 10 for providing a symbol for transmission, a unit 11 for selecting a plurality of carrier frequencies for the provided symbol, a unit 12 for determining suitable weighting parameters for the respective selected carrier frequencies, and a unit 13 for transmitting the symbol on the selected carrier frequencies according to the determined weighting parameters. The arrangement can be provide in a node in a communication system, i.e. base station, relay station, user terminal. In a corresponding manner, a receiving node has to be able to and have the means to receive the transmitted symbol, or in essence a representation of the combination of the selected carriers, and synchronize the channel based on the symbol.

There are several advantages of the sub-carrier combining in OFDM-based RACH:

Better pulse shape in frequency domain, which is robust against the frequency offset or Doppler shift. It also means better synchronization and receiver performance than the traditional OFDM.

Better time-domain power roll-off, which is good against the large delay spread.

The combining ratio can be very flexible, varying from 2 to any higher value. The more sub-carriers are combined, the better performance can be obtained. Accordingly, RACH can be kept with a fixed power but a ramped-up combining ratio to get random access.

Such sub-carrier combining has the weighted time-domain periodicity, which can be used for synchronization.

Furthermore, such structure can be designed with or without pilots. An example of the data-only RACH transmits the data symbols with given combining ratio, which is much efficient than the pilot-based RACH.

Advantages of the methods and arrangements of the present invention comprise:

Robustness: The PCC-based sub-carrier combing gives a good spectral roll-off and pulse-shape, which is very robust against the frequency offset and Doppler shift. The time-domain periodicity of the weighted sub-carrier combining signal makes the synchronization possible. Further more, this structure is still based on IFFT/FFT, i.e. keeping the orthogonality among sub-carriers in OFDM.

Simplicity and flexibility: The sub-carrier combining structure is still based on IFFT/FFT implementation, which introduces a negligible amount of complexity comparing to the typical OFDM modulation. The combining ratio is very flexible, varying from 2 to higher value to reach different levels of robustness.

Efficiency: This RACH structure can be designed either with pilots or without pilots. The data-only frame is very efficient comparing to the traditional pilot-based RACH.

It will be understood by those skilled in the art that various modifications and changes may be made to the present invention without departure from the scope thereof, which is defined by the appended claims.

REFERENCES

[1] 3G TS 25.213, "*3GPP: Technical Specification Group Radio Access Network; Spreading and modulation (FDD)*", 3GPP Release 4, V.4.1.0, 2001-06.

[2] IEEE Std 802.16™-2004, "*IEEE Standard for Local and metropolitan area networks; Part 16: Air Interface for Fixed Broadband Wireless Access Systems*", IEEE Computer Society and IEEE Microwave Theory and Techniques Society, 2004 Aug.

[3] J. Armstrong, "Improved data transmission," Australian patent application PO8271, 1997.

[4] J. Armstrong, "*Polynomial cancellation coding of OFDM to reduce Intercarrier interference due to Doppler spread,*" IEEE Globecom, vol. 5, pp. 2771-2776, 1998.

[5] K. Seaton and J. Armstrong, "*Polynomial Cancellation Coding and Finite Differences*", IEEE Transactions on Information Theory, January 2000.

[6] J. Armstrong, J. Shentu and C. Tellambura, "*Frequency Domain Equalization for OFDM systems with mapping of data onto sub-carrier pairs and overlapping symbol periods*", Proceedings of the 5$^{th}$ International Symposium on Communications Theory and Applications, England, July 1999, pp. 102-104.

The invention claimed is:

1. A method of enabling synchronization for a channel between two nodes in an Orthogonal Frequency Division Multiplexing (OFDM) based telecommunication system, comprising:

providing a data symbol for transmission, wherein the data symbol is a predetermined pilot symbol;

selecting at least two sub carrier frequencies;

determining a respective weighting parameter for each of said selected at least two sub carrier frequencies, transmitting, during a symbol time, the symbol time being a duration of the data symbol, said provided data symbol on each of said at least two selected sub carrier frequencies based on said determined weighting parameter to enable synchronization of said channel, said channel is a Random Access Channel in the OFDM based telecommunication system; and initially selecting two sub carrier frequencies, and repeating the steps of selecting, determining, and transmitting for an increasing number of selected sub carrier frequencies until synchronization of the channel is achieved between the two nodes.

2. The method according to claim 1, comprising determining said respective weighting parameters according to polynomial cancellation coding.

3. The method according to claim 1, wherein said data symbol also includes a payload data symbol.

4. The method according to claim 1, wherein said two nodes comprise a base station and a user terminal.

5. A system for enabling synchronization of a channel between two nodes in an Orthogonal Frequency Division Multiplexing (OFDM) based telecommunication system, comprising:
- a data symbol source that provides a data symbol for transmission, wherein the data symbol is a predetermined pilot symbol;
- a selector that selects at least two sub carrier frequencies;
- a weight determiner that determines a respective weighting parameter for each of said selected at least two sub carrier frequencies, and
- a transmitter that transmits, during a symbol time, said provided data symbol on each of said at least two selected sub carrier frequencies based on said determined weighting parameter to enable synchronization of said channel, said channel being a Random Access Channel in the OFDM based telecommunication system and the symbol time being a duration of the data symbol;

wherein two sub carrier frequencies are initially selected, and an increasing number of selected sub carrier frequencies are selected by the selector, weighted by the weight determiner and transmitted by the transmitter until synchronization of the channel is achieved between the two nodes.

6. A node for enabling synchronization of a channel to another node in an Orthogonal Frequency Division Multiplexing (OFDM) based telecommunication system, comprising:
- a data symbol source that provides a data symbol for transmission, wherein the data symbol is a predetermined pilot symbol;
- a selector that selects at least two sub carrier frequencies;
- a weight determiner that determines a respective weighting parameter for each of said selected at least two sub carrier frequencies, and
- a transmitter that transmits, during a symbol time, said provided data symbol on each of said at least two selected sub carrier frequencies based on said determined weighting parameter to enable synchronization of said channel, said channel being a Random Access Channel in the OFDM based telecommunication system and the symbol time being a duration of the data symbol;

wherein two sub carrier frequencies are initially selected, and an increasing number of selected sub carrier frequencies are selected by the selector, weighted by the weight determiner and transmitted by the transmitter until synchronization of the channel is achieved between the node and the another node.

7. A transmitting node in an Orthogonal Frequency Division Multiplexing (OFDM) based telecommunication system, comprising:
- a data symbol source that provides a data symbol for transmission to another node, wherein the data symbol is a predetermined pilot symbol;
- a selector that selects at least two sub carrier frequencies;
- a weight determiner that determines a respective weighting parameter for each of said selected at least two sub carrier frequencies, and
- a transmitter that transmits, during a symbol time, said provided data symbol on each of said at least two selected sub carrier frequencies based on said determined weighting parameter to enable synchronization of said channel, said channel being a Random Access Channel in the OFDM based telecommunication system and the symbol time being a duration of the data symbol;

wherein two sub carrier frequencies are initially selected, and weighting parameters are determined, the provided data symbol is transmitted, and an increasing number of selected sub carrier frequencies are selected by the selector, weighted by the weight determiner and transmitted by the transmitter until synchronization of the channel is achieved between the transmitting node and the another node.

8. A receiving node in an Orthogonal Frequency Division Multiplexing (OFDM) based telecommunication system, comprising:
- a receiver that, on a channel, receives a combined representation of a symbol transmitted on at least two sub carrier frequencies according to determined weighting parameters from another node; and
- a synchronizer that synchronizes said channel based on said received combined representation, said channel being a Random Access Channel in the OFDM based telecommunication system;

wherein the symbol includes a predetermined pilot symbol and is transmitted, during a symbol time, on each of the at least two selected sub carrier frequencies based on determined weighting parameters for each of the at least two sub carrier frequencies; the symbol time being a duration of the symbol; and two sub carrier frequencies being initially selected by the another node and weighting parameters being determined and the provided data symbol being transmitted for an increasing number of selected sub carrier frequencies until synchronization of the channel is achieved by the synchronizer.

* * * * *

UNITED STATES PATENT AND TRADEMARK OFFICE
CERTIFICATE OF CORRECTION

PATENT NO. : 8,305,872 B2
APPLICATION NO. : 12/522204
DATED : November 6, 2012
INVENTOR(S) : Nystrom et al.

It is certified that error appears in the above-identified patent and that said Letters Patent is hereby corrected as shown below:

In Column 5, Line 11, delete "form" and insert -- from --, therefor.

Signed and Sealed this
Second Day of April, 2013

Teresa Stanek Rea
*Acting Director of the United States Patent and Trademark Office*